United States Patent [19]
Lee

[11] Patent Number: 5,787,199
[45] Date of Patent: Jul. 28, 1998

[54] APPARATUS FOR DETECTING A FOREGROUND REGION FOR USE IN A LOW BIT-RATE IMAGE SIGNAL ENCODER

[75] Inventor: Min-Sup Lee, Seoul, Rep. of Korea

[73] Assignee: Daewoo Electronics, Co., Ltd., Seoul, Rep. of Korea

[21] Appl. No.: 580,235

[22] Filed: Dec. 28, 1995

[30] Foreign Application Priority Data

Dec. 29, 1994 [KR] Rep. of Korea ............ 94-38604

[51] Int. Cl.$^6$ .................. G06K 9/46; G06K 9/52; G06K 9/48; G06K 9/68
[52] U.S. Cl. .................. 382/203; 382/206; 382/194; 382/195; 382/199; 382/221; 382/239; 382/118; 348/415; 358/261.2
[58] Field of Search .................. 382/203, 204, 382/205, 206, 194, 195, 199, 201, 218, 221, 235, 236, 238, 239, 118; 348/413, 414, 415, 416; 358/261.2

[56] References Cited

U.S. PATENT DOCUMENTS

| | | | |
|---|---|---|---|
| 5,150,432 | 9/1992 | Ueno et al. | 382/250 |
| 5,237,410 | 8/1993 | Inoue | 358/136 |
| 5,247,590 | 9/1993 | Fukuhara | 382/243 |
| 5,373,567 | 12/1994 | Takahashi et al. | 382/243 |
| 5,467,086 | 11/1995 | Jeong | 348/415 |
| 5,490,225 | 2/1996 | Kumagai | 382/227 |
| 5,546,129 | 8/1996 | Lee | 348/416 |
| 5,596,362 | 1/1997 | Zhou | 382/118 |
| 5,612,743 | 3/1997 | Lee | 382/243 |
| 5,615,287 | 3/1997 | Fu et al. | 382/236 |

*Primary Examiner*—Andrew W. Johns
*Assistant Examiner*—Bipin Shalwala
*Attorney, Agent, or Firm*—Pennie & Edmonds LLP

[57] ABSTRACT

An apparatus, for use in a low bit-rate image signal encoder, for detecting a foreground region in an image signal, wherein the image signal has a number of objects therein and the foreground region has at least one moving object therein, which comprises: a previous frame memory for storing a previous frame of the image signal; a current frame memory for storing a current frame of the image signal; a change detector for comparing the current frame and the previous frame to detect changed pixels, each changed pixel having a differential luminance value; a region detector for detecting an object region for one of the objects in the current frame; and a foreground/background determinator for counting the number of all of the pixels contained in the object region to determine a first size of the object region; and for counting the number of changed pixels which are located in the object region to determine a second size of the object region; and for comparing the first size with the second size to determine whether the object region is the foreground region.

12 Claims, 3 Drawing Sheets

5,787,199

1

APPARATUS FOR DETECTING A FOREGROUND REGION FOR USE IN A LOW BIT-RATE IMAGE SIGNAL ENCODER

FIELD OF THE INVENTION

The present invention relates to a low bit-rate image signal encoder; and, more particularly, to an apparatus for detecting a foreground region included in an image signal.

DESCRIPTION OF THE PRIOR ART

In a digital television system such as video-telephone, teleconference or high definition television, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is inevitable to compress or reduce the volume of data through the use of various data compression techniques, especially in the case of such low bit-rate image signal encoders as those used in video-telephone and teleconference systems.

One of such methods for encoding image signals for a low bit-rate encoding system is the so-called object-oriented analysis-synthesis coding technique(see Michael Hötter, "Object-Oriented Analysis-Synthesis Coding Based on Moving Two-Dimensional Objects", *Signal Processing: Image Communication*, 2, No. 4, pp. 409–428(December, 1990)).

According to the object-oriented analysis-synthesis coding technique, an input video image is first divided into two parts: i.e., a foreground region having moving objects; and a background region which contains no moving objects. Then, the foreground region is divided according to the moving objects; and, three sets of parameters for defining the motion, contour and pixel data of each object are processed through different encoding channels. Specifically, in this technique, a change detector is employed to determine changed and unchanged parts of two successive frames by calculating the difference between a current frame and a previous frame on a pixel-by-pixel basis, and the whole of the changed parts is designated as a foreground region and the unchanged parts as the background region.

Since, however, the changed parts are determined in units of pixels, the foreground region detected by the change detector will not always coincide with the whole region taken up by the moving objects. Therefore, the input video image cannot be divided exactly into the foreground and the background regions, tending to deteriorate the performance of the low bit-rate image signal encoder.

SUMMARY OF THE INVENTION

It is, therefore, a primary object of the present invention to provide an apparatus for exactly detecting a foreground region included in an image signal.

In accordance with one embodiment of the invention, there is provided an apparatus, for use in a low bit-rate image signal encoder, for detecting a foreground region in an image signal, wherein the image signal has a number of objects therein and the foreground region has at least one moving object therein, which comprises:

a previous frame memory for storing a previous frame of the image signal;

a current frame memory for storing a current frame of the image signal;

2 a change detector for comparing the current frame and the previous frame to detect changed pixels, each changed pixel having a differential luminance value;

a region detector for detecting an object region occupied by one of the objects in the current frame; and a foreground/background determinator for counting the number of pixels contained in the object region to determine a first size of the object region; and for counting the number of changed pixels which are located in the object region to determine a second size of the object region; and for comparing the first size with the second size to determine whether the object region is the foreground or the background region.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
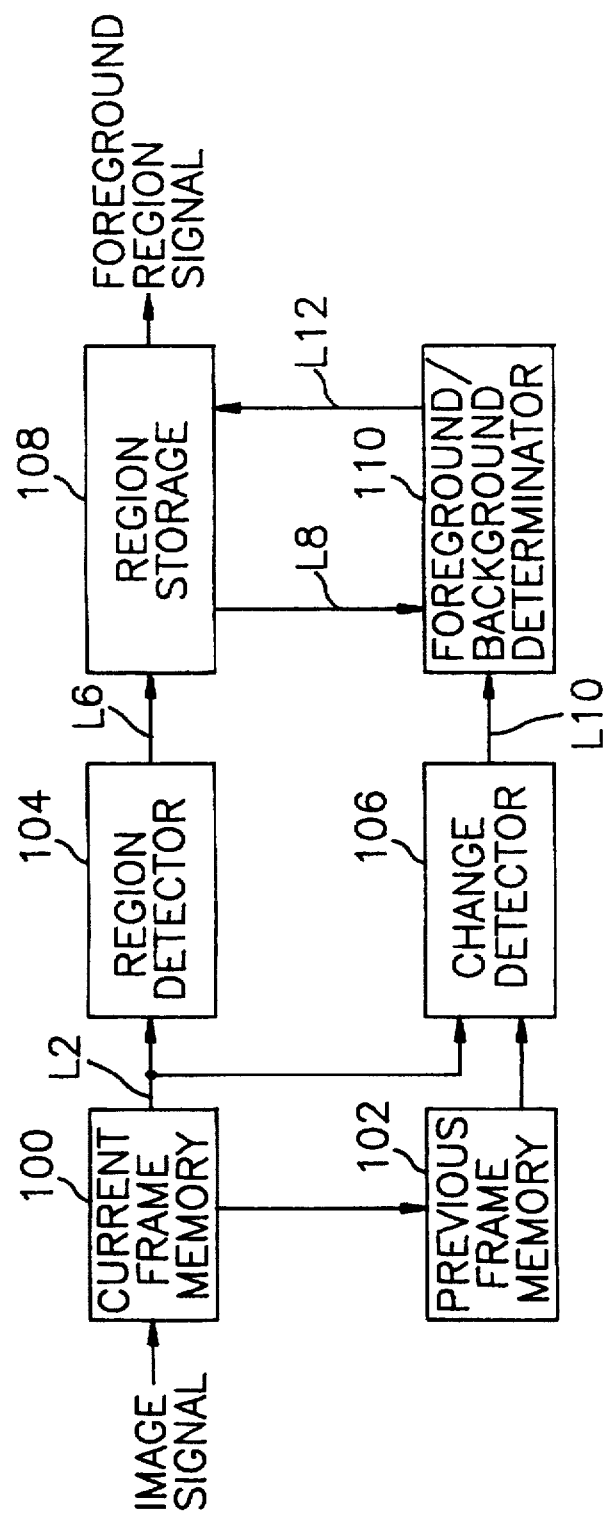
FIG. 1 shows a schematic block diagram illustrating a foreground region detecting apparatus in accordance with the present invention.

Referring to FIG. 1, there is shown a foreground region detecting apparatus in accordance with the present invention. The foreground region detecting apparatus includes a current frame memory 100, a previous frame memory 102, a region detector 104, a change detector 106, a region storage 108 and a foreground/background determinator 110.

The current frame memory 100 serves to receive an image signal from a known image source in order to store a current frame. The current frame includes a foreground region having moving objects and a background region having no moving object. The current frame is provided to the previous frame memory 102 and is applied via line L2 to the region detector 104 and the change detector 106. At the previous frame memory 102, a previous frame of the image signal is stored. The previous frame is provided to the change detector 106.

The region detector 104 detects a region occupied by one of the objects in the current frame retrieved from the current frame memory 100. The region is detected as follows: first, a contour of an object in the current frame is detected through the use of a known edge detection technique employing a known edge detection operator, e.g., a sobel operator. Then, the contour is processed to provide region information for defining the region of the object. The region information is applied via L6 to the a region storage 108 wherein each region for each of the moving objects is stored therein. The region information from the region storage 108 is applied to the foreground/background determinator 110 via line L8.

The change detector 106 compares the current frame retrieved from the current frame memory 100 with the previous frame from the previous frame memory 102 to detect a changed area in the current frame. The changed area is determined as follows: an absolute value of a difference between a luminance value for each of the pixels of the current frame and that for its corresponding pixel in the previous frame is computed; and then the absolute value is compared with a first threshold value Th1. If the absolute value is larger than or equal to Th1, it implies that there is a change of luminance value and thus a given pixel is included in the changed area. Otherwise, the given pixel is included in the unchanged area. A changed area signal representing the detected changed area is sent via line L10 to the foreground/background determinator 110. At the foreground/background determinator 110, in response to the region information from the region storage 108 and the changed area signal from the change detector 106, the number of changed pixels located in a region is counted to determine whether the region is changed or not. If more than a predetermined portion of pixels in a given region are changed pixels, the region will be included in the foreground region. Details of the foreground/background determinator 110 are described with reference to FIG. 2.

Figure 2:
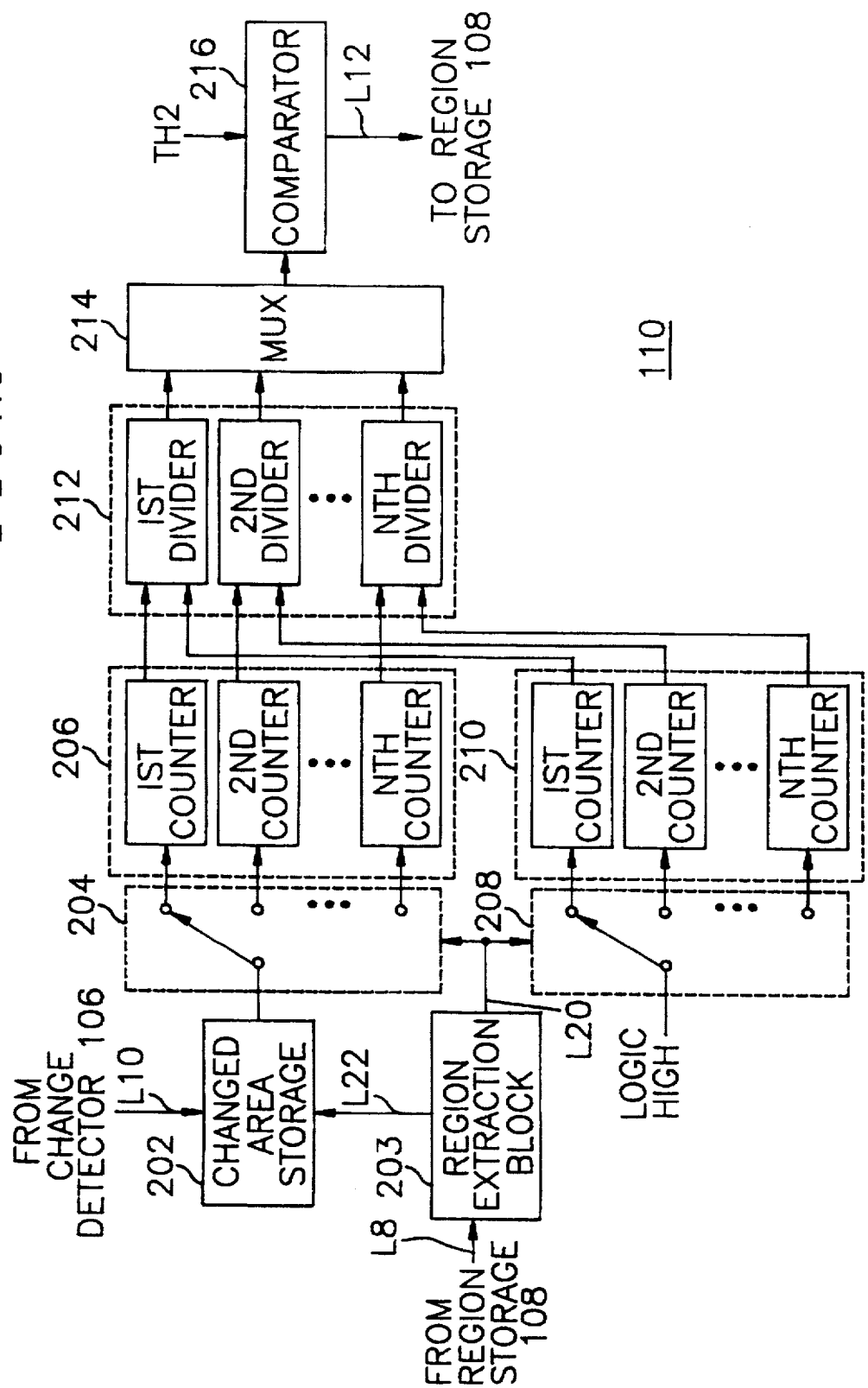
FIG. 2 shows a detailed block diagram of the foreground/background determinator of FIG. 1.

Referring to FIG. 2, the changed area signal received via line L10 from the change detector 106 is stored at a changed area storage 202. In the meantime, the region information from the region storage 108 is applied to a region extraction block 203. The region extraction block 203 serially extracts all of the pixels stored in the region storage 108, supplies a pixel position signal representing the position of an extracted pixel via line L22 to the changed area storage 202 and also provides switches 204 and 208 with a switching control signal representing which region the extracted pixel belongs to. The changed area storage 202 responds to the pixel position signal from the region extraction block 203 by generating "0" representing an unchanged area, or "1" representing a changed area.

Figure 3:
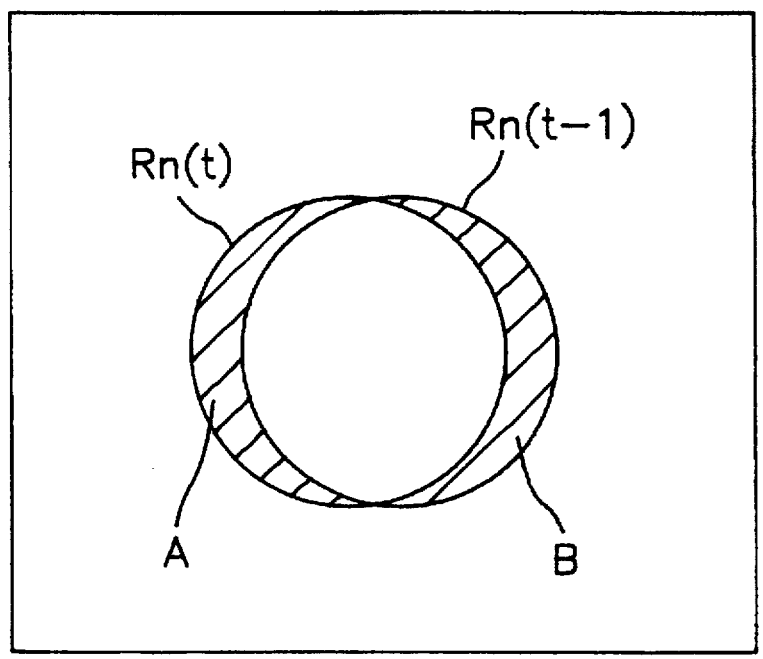
FIG. 3 represents two overlapped exemplary regions for describing the foreground/background determinator of FIG. 1.

The first switch 204 responds to the switching control signal from the region extraction block 203 by supplying its input, i.e., "0" or "1", to a changed size determinator 206. The changed size determinator 206 has a number of counters, wherein each of the counters counts the number of 1's in its input to determine the size of a changed portion, i.e., the number of changed pixels in the region. The determined size of the changed portion is sent to a ratio calculation block 212. In the meantime, the second switch 208 responds to the switching control signal by supplying its input, i.e., logic high signal "1", to a region size determinator 210. The region size determinator 210 has a number of counters, wherein each of the counters counts the number of 1's in its input to determine the size of a region, i.e., a total number of pixels in the region. The determined size of the region is sent to the ratio calculation block 212. The ratio calculation block 212 has a number of dividers and each of the dividers calculates the ratio of the size of the changed portion to the size of the region. For example, in case of the two regions Rn(t) of a current frame and Rn(t-1) of a previous frame are shown overlapped in FIG. 3, the ratio of the size of the changed portion to the size of the region is the ratio of the hatched area A to the size of the region Rn(t). Each ratio computed by the dividers of the ratio calculation block 212 is provided through a multiplexer 214 to serially apply each ratio to a comparator 216 wherein each ratio is compared with a second threshold value Th2 to determine whether the ratio is larger than Th2. If the ratio is larger than Th2, the corresponding region is classified as a foreground region, otherwise, the region is classified as a background region. The comparison result is provided via line L12 to the region storage 108 wherein the region classified as foreground region is produced.

While the present invention has been described with respect to the particular embodiments, it will be apparent to those skilled in the art that various changes and modifications may be made without departing from the spirit and the scope of the invention as defined in the following claims.

What is claimed is:

1. An apparatus, for use in a low bit-rate image signal encoder, for detecting a foreground region in an image signal, wherein the image signal has a number of objects therein and the foreground region has at least one moving object therein, which comprises:

means for storing a previous frame of the image signal;

means for storing a current frame of the image signal;

means for comparing the current frame and the previous frame to detect changed pixels, each changed pixel having a differential luminance value;

means for detecting an object region occupied by one of the objects in the current frame;

means for counting the number of all of the pixels contained in the object region to determine a first size of the object region;

means for counting the number of changed pixels which are located in the object region to determine a second size of the object region; and means for comparing the first size with the second size to determine whether the object region is the foreground region.

2. The apparatus of claim 1, said comparing means includes:

means for calculating an absolute value of a difference between a luminance value for each of the pixels of the current frame and that for its corresponding pixel of the previous frame; and means for comparing the absolute value with a predetermined threshold to detect the changed pixel.

3. The apparatus of claim 2, said detecting means includes:

means for detecting a contour of an object in the current frame to produce contour information; and means for defining the object region based on the contour information.

4. The apparatus of claim 3, wherein the contour is detected by using a sobel operator.

5. An apparatus, for use in a low bit-rate image signal encoder, for detecting a foreground region in an image signal, wherein the image signal is inputted on a frame-by-frame basis and the foreground region represents a region having one or more moving objects, said apparatus comprising:

object detecting means for detecting one or more object regions for a current frame from the input image, wherein each object region contains an object;

changed pixel detecting means for comparing the current frame and a previous frame on a pixel-by-pixel basis to detect changed pixels in the current frame, wherein each changed pixel in the current frame represents a current pixel which is different from a corresponding previous pixel in the previous frame; and a foreground region determinator for determining the foreground region in the current frame based on the number of changed pixels contained in each object region, wherein said changed pixel detecting means includes:

means for calculating a pixel difference between a pixel value of each pixel in the current frame and that of a corresponding pixel in the previous frame; and means for comparing the pixel difference with a predetermined threshold in order to determine whether or not said each pixel is a changed pixel; and wherein said foreground region determinator includes:

means for counting a number of changed pixels contained in said each object region in the current frame;

means for counting a total number of pixels contained in said each object region in the current frame; and a comparator for comparing said number of changed pixels with said total number of pixels to determine whether or not said each object region is a foreground region.

6. The apparatus according to claim 5, wherein said comparator calculates a ratio of said number of changed pixels to said total number of pixels, and compares aid ration with a predetermined threshold to determine whether or not said each object region is a foreground region.

7. The apparatus according to claim 5, wherein said object detecting means includes:

means for detecting a contour of an object in the current frame to produce contour information; and means for defining said each object region based on the contour information.

8. The apparatus according to claim 7, wherein the contour is detected by using a Sobel operator.

9. A method for detecting a foreground region in an image signal, wherein the image signal has a number of objects therein, at least one of which objects moves between a previous frame of the image signal and a current frame of the image signal, said method comprising the steps of:

storing said previous frame;

storing said current frame;

comparing the previous and current frames to detect changed pixels, each changed pixel signifying a pixel in the current frame whose pixel value in the current frame differs from its corresponding pixel value in the previous frame by more than a first predetermined threshold;

detecting an object region corresponding to an object in the current frame;

counting the total number of pixels in said object region;

counting the number of changed pixels in said object region; and comparing the number of changed pixels to the total number of pixel in said object region to determine whether the object region is a foreground region.

10. The method of claim 9, wherein said step of comparing the number of changed pixels to the total number of pixels comprises the steps of:

calculating a ratio of the number of changed pixels to the total number of pixels;

comparing the ratio to a second predetermined threshold; and classifying the object region as a foreground region, if the ratio exceeds the second predetermined threshold.

11. The method of claim 9, wherein said step of detecting an object region comprises the steps of:

detecting a contour of said object in the current frame to produce contour information; and defining the object region based on the contour information.

12. The method of claim 11, wherein said step of detecting a contour is performed by using a Sobel operator.

* * * * *